Oct. 25, 1938.   C. W. SINCLAIR   2,134,419
VEHICLE WHEEL
Filed Sept. 25, 1935
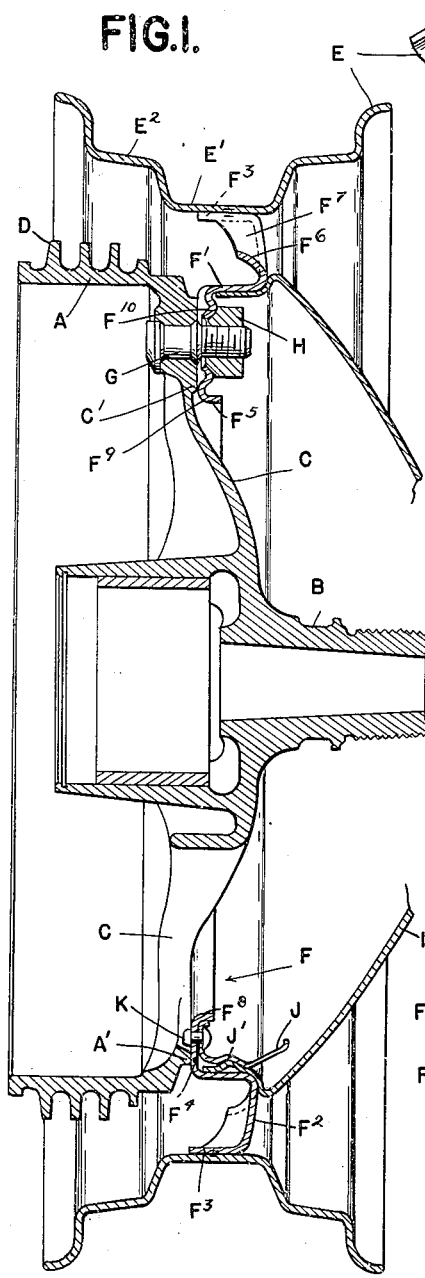
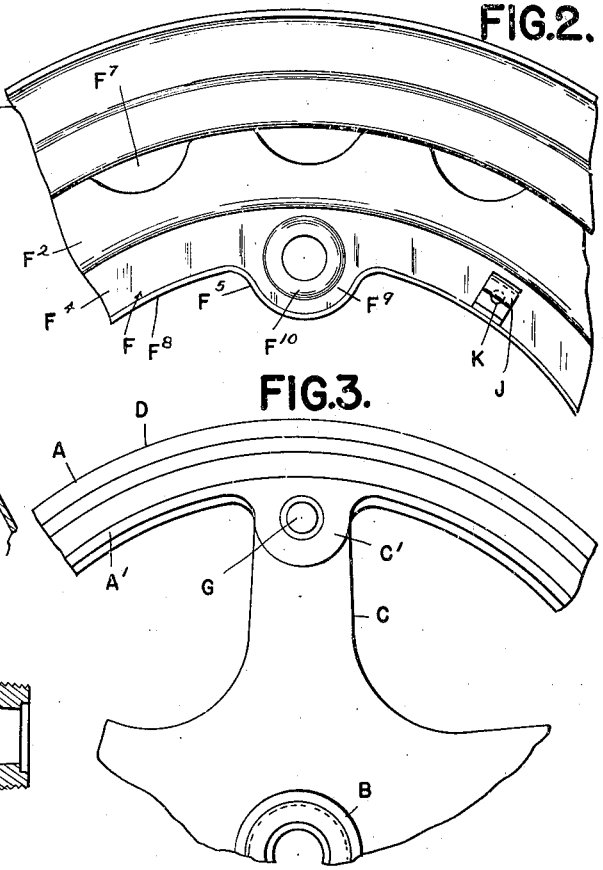
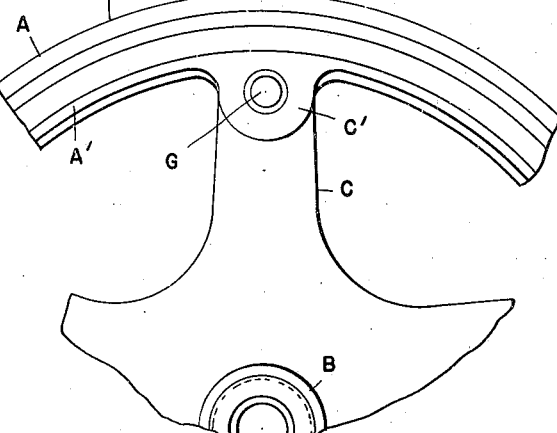
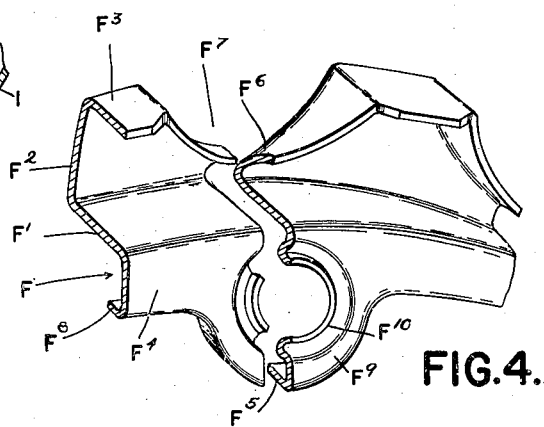
INVENTORS
CHARLES W. SINCLAIR
BY Whittemore Hulbert
Whittemore & Belknap
ATTORNEYS Patented Oct. 25, 1938

2,134,419

UNITED STATES PATENT OFFICE 2,134,419

VEHICLE WHEEL

Charles W. Sinclair, Detroit, Mich., assignor to Kelsey-Hayes Wheel Company, Detroit, Mich., a corporation of Delaware Application September 25, 1935, Serial No. 42,114

3 Claims. (Cl. 301—6)

In the development of the automotive industry during recent years, there has been a progressive decrease in the diameter of wheels employed and a coincident increase in the cross-sectional diameter of tires. Furthermore, with increase in motive power there has been the necessity for a corresponding increase in brake power and, consequently, an increase in diameter of the brake drums. Due to these changes, the difference between the diameters of the brake drum and the tire engaging rim has been greatly diminished so that in some constructions there is scarcely more than clearance for the one within the other.

The present invention relates to wheels such as just referred to and has for its object the obtaining of a simple construction of means for mounting the wheel rim upon the brake drum without detriment to the latter. To this end, the invention consists in the construction as hereinafter set forth.

In the drawing:

Figure 1 is an axial cross-section through a wheel of my improved construction;

Figure 2 is a side elevation of a portion of the rim and annulus detached from the drum;

Figure 3 is a side elevation of a portion of the drum;

Figure 4 is a sectional perspective view of a portion of the annulus.

In the specific construction illustrated, the brake drum A is formed integral with the wheel hub B being connected thereto by a series of radial spokes C of channel-shaped cross-section. These parts are all formed of a single casting and the drum A is further provided with outwardly extending annular radiating fins D for dissipating heat. The wheel rim E is of the type known as drop-center, comprising an annular central portion $E'$ which is of a smaller diameter than the side portions $E^2$ on which the tire is normally seated. Thus, the space between the drum and the rim is quite restricted, the internal diameter of the drum being over 80% of the internal diameter of the drop portion $E'$ of the rim.

To demountably secure the rim E to the wheel hub, I have provided a construction of pressed sheet metal annulus F which is fixedly secured to the rim and is bolted to the spokes C. The outer portion of this annulus is preferably fashioned to form a series of short hollow spokes with openings therebetween permitting circulation of air from outside the wheel to the finned surface of the brake drum. The inner portion of the annulus forms the bolting-on flange being provided with apertured ears that register with the respective spokes and engage clamping bolts G secured to and projecting laterally from said spokes. Intermediate this bolting-on flange portion and the outer spoked portion is an axially extending portion of substantially cylindrical form. This performs several important functions including a more uniform distribution of rim shocks to the bolting-on flange; a reinforcement for the brake drum; and a socket for receiving and holding the hub cover.

More in detail, the annulus F is of a substantially S-shaped radial cross-section having the central axially extending and substantially cylindrical portion $F'$, a radially outwardly extending portion $F^2$ in the plane of each spoke terminating in an axially extending return-bent portion $F^3$ for fitting within the portion $E'$ of the rim, and a radially inwardly extending portion $F^4$ in the radial plane of each bolt terminating in an axially extending flange $F^5$. In an intermediate plane between the spokes the outer portion of the annulus is provided with a return-bent flange $F^6$ which extends around the aperture $F^7$ and merges into the flanges $F^3$. The inner portion of the annulus in a radial plane intermediate the bolts is provided with a return-bent flange $F^8$ which is located substantially in the circle of the centers of the bolts G and which extends around said bolts to merge into the flange $F^5$. This forms a series of radially inwardly extending ears $F^9$ which are concentric with the bolts and which are reinforced by the flanges $F^5$ and $F^8$. There is also an apertured embossed portion $F^{10}$ in said ears forming a resilient seat for the clamping nut H.

The spokes C which connect the hub to the brake drum are formed with a slightly raised boss $C'$ surrounding the bolt G. There is also a rib $A'$ extending around the outer edge of the drum and merging into the bosses $C'$. Thus, the outer faces of the rib and bosses are in the same plane and bear against the inner face of the portion $F^4$ of the annulus F. This produces a seal which will prevent dust or dirt passing through the apertures $F^7$ from finding access to the interior of the drum.

The annulus F is secured to the rim E preferably by spot-welding each of the portions $F^3$ to the abutting portion $E'$ of the rim. To complete the wheel a cap or cover member I is provided, this being fashioned to enclose the hub and having a cylindrical marginal edge for engaging the socket formed by the portion $F'$ of the annulus. To hold the cover in position spring clips J are secured to the member F preferably by riveting them at K to the portion F⁴. These clips are further provided with a notch or recess J' for yieldably engaging a suitable detent on the cover L.

With the construction, as described, when the rim is mounted on the brake drum, the annulus F will transmit rim shocks directly to the spokes and through the latter to the hub without unduly stressing the brake drum. Furthermore, the cylindrical portion F' which extends from the spokes in an opposite direction from the drum forms a reinforcement for the latter. A seal joint is formed between the annulus and the drum by reason of the rib A', and when the cover I is placed in position all access of dirt to the interior of the drum is prevented.

What I claim as my invention is:

1. In a vehicle wheel, the combination with a brake drum comprising a web and an annular brake engaging member, of a sheet metal wheel body mounted on and more flexible than said web, said web and wheel body forming the major and minor portions respectively of the radial extent of the load supporting portion of the wheel between the hub and rim, said wheel body comprising a generally radial bolting-on flange detachably secured to said web, a generally axial continuous annular portion extending in an outboard direction from the periphery of said bolting-on flange and closely adjacent to the bolt holes therein, a nave portion connecting only into the outboard end of said generally axial portion and extending in an inboard direction, and generally radial spoke formations connecting into said nave portion, said generally axial portion reinforcing said wheel body and preventing flexing of said wheel body from localizing in said bolting-on flange and said web being constructed and arranged to carry the load transmitted by said wheel body without detrimental distortion of said brake engaging member.

2. In a vehicle wheel, the combination with a brake drum comprising a web and an annular brake engaging member, of a sheet metal wheel body mounted on and lighter than said web and providing for flexibility, said web and wheel body forming the major and minor portions respectively of the radial extent of the load supporting portion of the wheel between the hub and rim, said wheel body comprising a generally radial bolting-on flange detachably secured to said web, a generally axial continuous annular portion extending in an outboard direction from the periphery of said bolting-on flange, and generally radial spoke formations connecting only into the outboard end of said generally axial portion, said generally axial portion extending from said bolting-on flange closely adjacent the bolt receiving portion of said bolting-on flange, reinforcing said wheel body and preventing flexing of said wheel body from localizing in the bolt receiving portion, said web being constructed and arranged to carry the load transmitted by said wheel body without detrimental distortion of said brake engaging member.

3. In a vehicle wheel, the combination with a hub and a load supporting member thereon constructed to support a brake engaging member, of a rim and a sheet metal wheel body secured to said rim and mounted on and more flexible than said load supporting member, said load supporting member and wheel body forming the major and minor portions respectively of the radial extent of the load supporting portion of the wheel between said hub and rim, said wheel body comprising an inner generally radial bolting-on flange detachably secured to said load supporting member, an outer generally radial load supporting portion secured to said rim and an intermediate generally axial continuous annular portion connected to one end to said inner bolting-on flange in close proximity to the bolt holes and at the opposite end to said outer load supporting portion, whereby said annular portion reinforces said wheel body and controls flexing of said wheel body to prevent localizing the flexing in said bolting-on flange and whereby said annular portion and bolting-on flange serve to reinforce said load supporting member.

CHARLES W. SINCLAIR.